United States Patent
Chia et al.

(10) Patent No.: US 6,795,261 B2
(45) Date of Patent: Sep. 21, 2004

(54) METHOD AND APPARATUS FOR INCREASING PROCESS YIELDS OF DATA STORAGE DEVICES

(75) Inventors: KokHoe Chia, Singapore (SG); TeckKhoon Lim, Singapore (SG); CheeWai Lum, Singapore (SG); Myint Ngwe, Singapore (SG); BengWee Quak, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 355 days.

(21) Appl. No.: 09/893,090

(22) Filed: Jun. 27, 2001

(65) Prior Publication Data

US 2002/0036851 A1 Mar. 28, 2002

Related U.S. Application Data

(60) Provisional application No. 60/222,997, filed on Aug. 4, 2000.

(51) Int. Cl.[7] ............................. G11B 27/36; G11B 5/02
(52) U.S. Cl. .............................. 360/31; 360/53; 360/25
(58) Field of Search .............................. 360/53, 48, 51, 360/31

(56) References Cited

U.S. PATENT DOCUMENTS

| 5,216,655 A | 6/1993 | Hearn et al. |
| 5,247,633 A | 9/1993 | Nissimov et al. |
| 5,537,264 A | 7/1996 | Pinteric |
| 5,568,606 A | 10/1996 | Dobbek |
| 5,999,352 A | 12/1999 | Teck et al. |
| 6,446,156 B1 * | 9/2002 | Chia et al. ................ 711/4 |

FOREIGN PATENT DOCUMENTS

| GB | 2 326 755 A | 12/1998 |
| JP | 11-16258 | 1/1999 |

* cited by examiner

Primary Examiner—David Hudspeth
Assistant Examiner—Glenda P. Rodriguez
(74) Attorney, Agent, or Firm—Jennifer M. Buenzon

(57) ABSTRACT

Method and apparatus for increasing process yields of data storage devices which store data on media surfaces using read/write heads. An initial linear bit recording density is determined for each head, the linear bit recording density comprising a density at which each head is capable of writing data to and reading data from the corresponding media surface. Defective storage sectors are identified on the media surfaces to determine whether a sufficient number of logical storage sectors are available to meet a predetermined data storage capacity. The linear bit recording density of at least one of the heads is then altered to ensure that the storage device has sufficient logical storage sectors to meet the predetermined capacity.

21 Claims, 3 Drawing Sheets

METHOD AND APPARATUS FOR INCREASING PROCESS YIELDS OF DATA STORAGE DEVICES

RELATED APPLICATIONS

The present application claims benefit of the U.S. provisional patent application No. 60/222,997, filed Aug. 4, 2000.

FIELD OF THE INVENTION

The present invention relates to a method and apparatus for increasing process yields of data storage devices. The invention relates specifically to a technique for increasing process yields of magnetic disc drives.

BACKGROUND OF THE INVENTION

Data storage devices in the form of magnetic discs consist of a collection of platters rotating on a spindle. The platters are metal discs and are covered with magnetic recording material (usually on both sides) to thereby provide a plurality of media surfaces to which data can be written and from which it can be read. Each media surface is divided into concentric circles, called tracks. The number of tracks varies depending on the design parameters for the disc drive. Each track in turn is divided into a number of sectors that can be used to store data. A sector is the smallest unit to/from which data can be read or written.

To read and write information into a sector, a movable arm containing a read/write head is located over each surface. At least one read/write head is provided for each surface. Each movable arm is typically linked to a servo controlled position mechanism capable of moving the head (s) in a radial or lateral direction over the recording surface.

A controller is used to access the discs on the drive and manage the flow of data between a computer system and the disc drive. The controller sends commands to move the read/write head into the correct position. A controller typically includes one or more microprocessors and memories to perform these tasks.

Variations in the quality of the head and media components coupled with manufacturing variations can often result in a sector, a number of sectors, or even a whole track of sectors, becoming defective.

In order to address the problem of defects in the media surface, the storage device is typically constructed to have a number of spare sectors which can be used to replace damaged sectors. Thus, in a drive, the total number of physical sectors equals the total number of logical sectors plus a number of spare sectors. Further, in order to address the fact that different read/write heads will have different read/write capabilities, a variable bits per inch (VBPI) tuning technique has been developed. VBPI tuning involves testing each head and assigning different read/write densities to the heads in accordance with their relative capabilities while still providing the required number of physical sectors.

Typically, in order to meet a pre-specified capacity, the design specifications for a drive specify the logical sector requirement required to meet the pre-specified capacity, together with a spare sector requirement based on an assumption regarding the likely number of defective sectors to be found in the drive.

The problem with the foregoing technique is that VBPI tuning does not take into consideration the number of spare sectors which will actually be needed in order to provide the designed for number of logical sectors. If there are too many defective sectors or tracks, there may be insufficient sectors to meet the design criteria, in which case the drive will fail to pass the test process.

Accordingly, it would be desirable to provide a technique which ensures that sufficient spare sectors are provided. It would be advantageous if such a technique also ensured that the risk of failure of any read/write heads was minimized. The present invention provides these and other advantages, and offers a solution over problems faced by the prior art.

SUMMARY OF THE INVENTION

Accordingly, one embodiment of the present invention provides a method of increasing process yields of data storage devices in which data is stored on a plurality of media surfaces, and at least one read/write head is associated with each media surface in order to read/write data from/to each media surface, the method comprising the steps of: (a) testing each read/write head in order to allocate a read/write density to each read/write head relating to the density at which each read/write head is capable of reading/writing data from/to a media surface; (b) determining whether said data storage device will have sufficient logical storage sectors to provide a predetermined data storage capacity for said data storage device if the allocated read/write densities are used in said data storage device; and (c) altering the allocated read/write density of at least one read/write head if necessary so as to ensure that said storage device has sufficient logical storage sectors.

Another embodiment of the present invention provides an apparatus for increasing process yields of data storage devices in which data is stored on a plurality of media surfaces, and at least one read/write head is associated with each media surface in order to read/write data from/to each media surface, the apparatus comprising: (a) first means for testing each read/write head in order to allocate a read/write density to each read/write head relating to the density at which each read/write head is capable of reading/writing data from/to a media surface; (b) second means for determining whether said data storage device will have sufficient logical storage sectors to provide a predetermined data storage capacity for said data storage device if the read/write densities allocated by the first means are used in said data storage device; and (c) third means for altering the allocated read/write density of at least one read/write head as necessary so as to ensure that said storage device has sufficient logical storage sectors.

Another embodiment of the present invention provides a data storage device which is using the above method.

These and various other features as well as advantages which characterize the present invention will be apparent upon reading of the following detailed description and review of the associated drawings.

DETAILED DESCRIPTION

Figure 1:
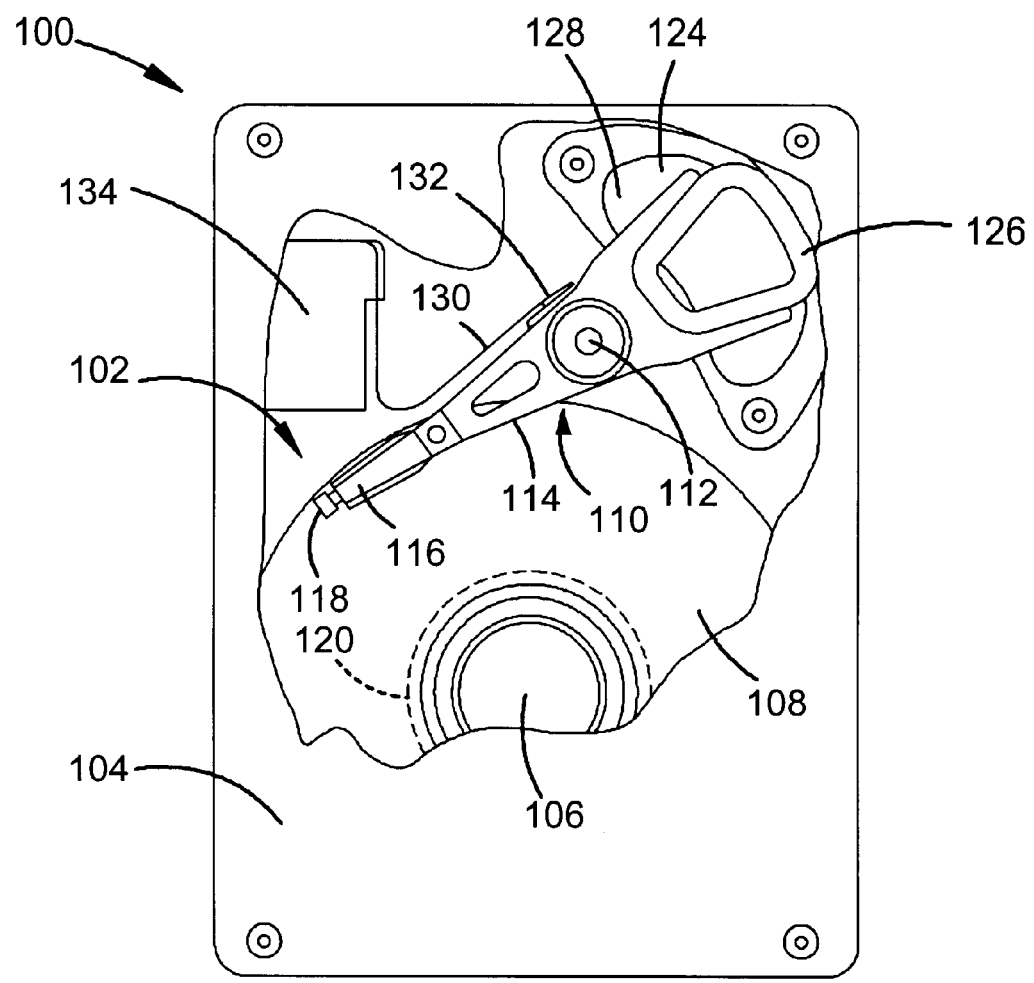
FIG. 1 is a top view of a disc drive constructed in accordance with a preferred embodiment of the present invention.

A disc drive 100 constructed in accordance with a preferred embodiment of the present invention is shown in FIG.

1. The disc drive 100 includes a base 102 to which various components of the disc drive 100 are mounted. A top cover 104, shown partially cut away, cooperates with the base 102 to form an internal, sealed environment for the disc drive in a conventional manner. The components include a spindle motor 106, which rotates one or more discs 108 at a constant high speed. Information is written to and read from tracks on the discs 108 through the use of an actuator assembly 110, which rotates during a seek operation about a bearing shaft assembly 112 positioned adjacent the discs 108. The actuator assembly 110 includes a plurality of actuator arms 114 which extend towards the discs 108, with one or more flexures 116 extending from each of the actuator arms 114. Mounted at the distal end of each of the flexures 116 is a head 118, which includes an air bearing slider enabling the head 118 to fly in close proximity above the corresponding surface of the associated disc 108.

During a seek operation, the track position of the heads 118 is controlled through the use of a voice coil motor (VCM) 124, which typically includes a coil 126 attached to the actuator assembly 110, as well as one or more permanent magnets 128 which establish a magnetic field in which the coil 126 is immersed. The controlled application of current to the coil 126 causes magnetic interaction between the permanent magnets 128 and the coil 126 so that the coil 126 moves in accordance with the well-known Lorentz relationship. As the coil 126 moves, the actuator assembly 110 pivots about the bearing shaft assembly 112, and the heads 118 are caused to move across the surfaces of the discs 108.

The spindle motor 116 is typically de-energized when the disc drive 100 is not in use for extended periods of time. The heads 118 are moved over park zones 120 near the inner diameter of the discs 108 when the drive motor is de-energized. The heads 118 are secured over the park zones 120 through the use of an actuator latch arrangement, which prevents inadvertent rotation of the actuator assembly 110 when the heads are parked.

A flex assembly 130 provides the requisite electrical connection paths for the actuator assembly 110 while allowing pivotal movement of the actuator assembly 110 during operation. The flex assembly includes a printed circuit board 132 to which head wires (not shown) are connected; the head wires being routed along the actuator arms 114 and the flexures 116 to the heads 118. The printed circuit board 132 typically includes circuitry for controlling the write currents applied to the heads 118 during a write operation and a preamplifier for amplifying read signals generated by the heads 118 during a read operation. The flex assembly terminates at a flex bracket 134 for communication through the base deck 102 to a disc drive printed circuit board (not shown) mounted to the bottom side of the disc drive 100.

In a typical design process of the prior art, in order to provide a pre-specified capacity assumptions are made regarding the likely number of defective sectors to be found in the drive and the number of physical sectors is chosen so that there will be sufficient logical sectors to provide the pre-specified capacity. Thus, the number of physical sectors=number of logical sectors+number of spare sectors.

Consider the example of a drive where the design parameters have been determined to be a logical sector requirement of 7,200,000 sectors per media surface and a spare sector requirement of 30,000 sectors per media surface. Table 1 below shows the logical and physical requirement for a number of configurations using these design parameters.

TABLE 1

| Configuration | Total Logical Sector Requirement | Spare Sector Requirement | Total Physical Sector Requirement |
| --- | --- | --- | --- |
| 1 Disk 1 head | 7,200,000 | 30,000 | 7,230,000 |
| 1 Disc 2 heads | 14,400,000 | 60,000 | 14,460,000 |
| 2 Discs 2 heads | 21,600,000 | 90,000 | 21,690,000 |
| 2 Discs 4 heads | 28,800,000 | 120,000 | 28,920,000 |

In order to be able to meet the above specifications, a zone table is defined. The zone table details the number of zones, the number of tracks and the number of sectors per track in each of these zones.

Additionally, in a variable bits per inch (VBPI) scheme, the zone table will usually include a nominal bits per inch (BPI) configuration, a set of BPI which is higher than the nominal BPI and a set of BPI which is lower than the nominal BPI. The nominal BPI is defined such that the total physical sectors will be the minimum sufficient to meet the requirements defined in Table 1. It is also defined as the default setting if VBPI is not turned on. In a single head drive where VBPI is not used, this nominal setting will be used.

TABLE 2

| Zone | 1 | 2 | 3 | 4 | 5 | 6 | 7 | 8 | 9 | 10 | Total Physical Sectors |
| --- | --- | --- | --- | --- | --- | --- | --- | --- | --- | --- | --- |
| No of Tracks in Zone | 1500 | 1600 | 1490 | 1400 | 1200 | 1300 | 1250 | 1350 | 1150 | 1560 | |
| No. of sectors per track with BPI = 5 | 568 | 566 | 546 | 530 | 520 | 496 | 486 | 450 | 428 | 406 | 6922500 |
| No. of sectors per track with BPI = 7 | 576 | 574 | 555 | 540 | 528 | 504 | 492 | 458 | 432 | 411 | 7025410 |
| No. of sectors per track with BPI = 7 | 582 | 582 | 562 | 549 | 534 | 512 | 498 | 466 | 440 | 420 | 7129380 |
| No. of sectors per track with BPI = 8 | 590 | 588 | 570 | 560 | 540 | 518 | 504 | 468 | 448 | 432 | 7231420 |
| No. of sectors per track with BPI = 9 | 600 | 594 | 580 | 570 | 546 | 524 | 510 | 480 | 452 | 436 | 7334460 |

TABLE 2-continued

| Zone | 1 | 2 | 3 | 4 | 5 | 6 | 7 | 8 | 9 | 10 | Total Physical Sectors |
|---|---|---|---|---|---|---|---|---|---|---|---|
| No. of sectors per track with BPI = 10 | 610 | 603 | 590 | 578 | 552 | 530 | 516 | 486 | 456 | 444 | 7437640 |
| No. of sectors per track with BPI = 11 | 618 | 610 | 597 | 586 | 560 | 540 | 524 | 492 | 460 | 452 | 7540250 |

From the above Table 2, which tabulates the sectors per track per zone with various BPI configurations, it can be observed that BPI setting of five is the lowest in the range on the read/write heads while BPI setting of eleven is the highest in the range of BPI values. A BPI of eight is determined to be the nominal setting because it meets the design specification of 7,230,000 physical sectors per media surface.

Now, consider a drive having four read/write heads with a logical sector requirement of 28,800,000. Table 3 below shows a configuration for a drive with a nominal BPI setting of eight.

TABLE 3

| | BPI Setting | Total Physical Sectors |
|---|---|---|
| Head 0 | 8 | 7,231,420 |
| Head 1 | 8 | 7,231,420 |
| Head 2 | 8 | 7,231,420 |
| Head 3 | 8 | 7,231,420 |
| | | 28,925,680 |

The total number of physical sectors using the nominal setting for each head would be 28,925,680. This means that the actual number of spare sectors generated can be calculated by subtracting the logical sector requirement (28,800,000) from the total number of physical sectors (28,925,680). The resulting number of spare sectors would be 125,680.

In the above case, the BPI setting for every head is set at nominal. In a normal test process for a drive, VBPI tuning will test each of the heads in a drive and then assign a quality index associated with each head. The quality index provides an indication of the density at which the head is capable of reading/writing. From the quality indexes of all the heads in the drive, a final BPI configuration is chosen such that the total physical sectors generated needs to be larger than the design specifications (ie 29,920,000 sectors from a four head drive. The BPI configuration takes into consideration the relative quality of the heads as indicated by the quality index, thus allocating higher BPI values to higher quality heads. Table 4 below shows some of the different combination of BPI configuration for a four head drive and the spare sector resulting from such configurations.

TABLE 4

| | Hd0 | Hd1 | Hd2 | Hd3 | Total Physical Sectors | Spare Sectors |
|---|---|---|---|---|---|---|
| Drive A | 7 | 8 | 9 | 8 | 28,926,680 | 126,680 |
| Drive B | 6 | 10 | 7 | 9 | 28,926,890 | 126,890 |
| Drive D | 7 | 11 | 6 | 8 | 28,926,460 | 126,460 |
| Drive C | 10 | 5 | 8 | 9 | 28,926,020 | 126,020 |

The total physical sectors in the drive can be calculated by adding the total physical sectors at each of the BPI setting selected in a certain configuration. Take Drive A for example, Head Zero has a BPI setting of seven and using table 2 above, the total number of physical sectors for such a setting can be determined to be 7,129,380 sectors. By summing Head Zero with a setting of seven (7,129,380), Head One with setting of eight (7,231,420), Head Two with setting of nine (7,334,460), and Head Three with setting of eight (7,231,420) the total number of physical sectors of Drive A can be calculated to be 28,926,680. Subtracting the logical requirement of 28,800,000 sectors, the number of spare sectors present in Drive A would be 126,680. As can be seen from Table 4 when the BPI is other than nominal the number of spare sectors will differ slightly, however there should still be sufficient spare sectors to meet the spare sector specification of 120,000 for a four head drive. Further details of VPBI tuning technique can be found in U.S. Pat. No. 5,999,352.

In the preferred embodiment, a check is done at the end of the test to determine if the number of spare sectors is sufficient to provide the number of logical sectors required to meet a predetermined storage capacity. If it is, then the drive will proceed in the normal manner. If there are insufficient spare sectors, the BPI will be adjusted so that more spare sectors are made available.

Consider Drive A of Table 4 again. If the test process determines that the number of spare sectors needed to replace the defective sectors and track is less than 126,680 sectors, then the final BPI configuration for that drive would be seven, eight, nine and eight for Heads Zero, One, Two and Three respectively as described above.

However, if the number of spare sectors needed to replace the defective sectors and tracks is greater than 126,680 sectors, technique of the preferred embodiment is employed. Consider that through testing it is determined that Drive A requires 130,000 spare sectors. Hence, using the read/write density allocated during VBPI tuning, there will be insufficient spare sectors. Thus, in the method and apparatus of the preferred embodiment will alter the allocated read/write density by incrementing Head Zero's BPI setting by one count. If this generates enough spare sectors, then the scheme will stop and use that as the final setting. Table 5 below shows the adjustment of the BPI of Head Zero to create additional spare sectors.

TABLE 5

|  | Hd0 | Hd1 | Hd2 | Hd3 | Total Physical Sectors | Spare Sectors |
|---|---|---|---|---|---|---|
| Drive A | 7 | 8 | 9 | 8 | 28,926,680 | 126,680 |
|  | 8 | 8 | 9 | 8 | 29,028,720 | 228,720 |

By increasing Head Zero's BPI setting by one, additional 102,040 spare sectors are created, thereby increasing the total spare sectors to 228,720. The new spare sectors created are sufficient to meet the 130,000 spare sectors requirement and thus the final configuration of the drive would be eight, eight, nine and eight for Heads Zero, One, Two and Three respectively.

Next, consider a drive that requires 500,000 spare sectors. As shown in Table 6 below, each Head's BPI setting will be incremented by one count starting from Head Zero until the number of spare sectors is sufficient. By incrementing the BPI's of the heads in order, the risk of a head failing to perform at the required level is minimized while ensuring that the required capacity is provided.

TABLE 6

|  | Hd0 | Hd1 | Hd2 | Hd3 | Total Physical Sectors | Spare Sectors |
|---|---|---|---|---|---|---|
| Drive A | 7 | 8 | 9 | 8 | 29,926,680 | 126,680 |
|  | 8 | 8 | 9 | 8 | 29,028,720 | 228,720 |
|  | 8 | 9 | 9 | 8 | 29,131,760 | 331,760 |
|  | 8 | 9 | 10 | 8 | 29,234,940 | 434,940 |
|  | 8 | 9 | 10 | 9 | 29,337,980 | 537,980 |

As Table 6 shows, by increasing all the heads BPI by one count, the total spare sectors is increased to 537,980, which is a 411,300 sectors increase over the original design. With the additional spare sectors created, the drive is now able to meet the 500,000 spare sector requirement. Hence the final configuration for the drive would be eight, nine, ten and nine for Heads Zero, One, Two and Three respectively.

Figure 2:
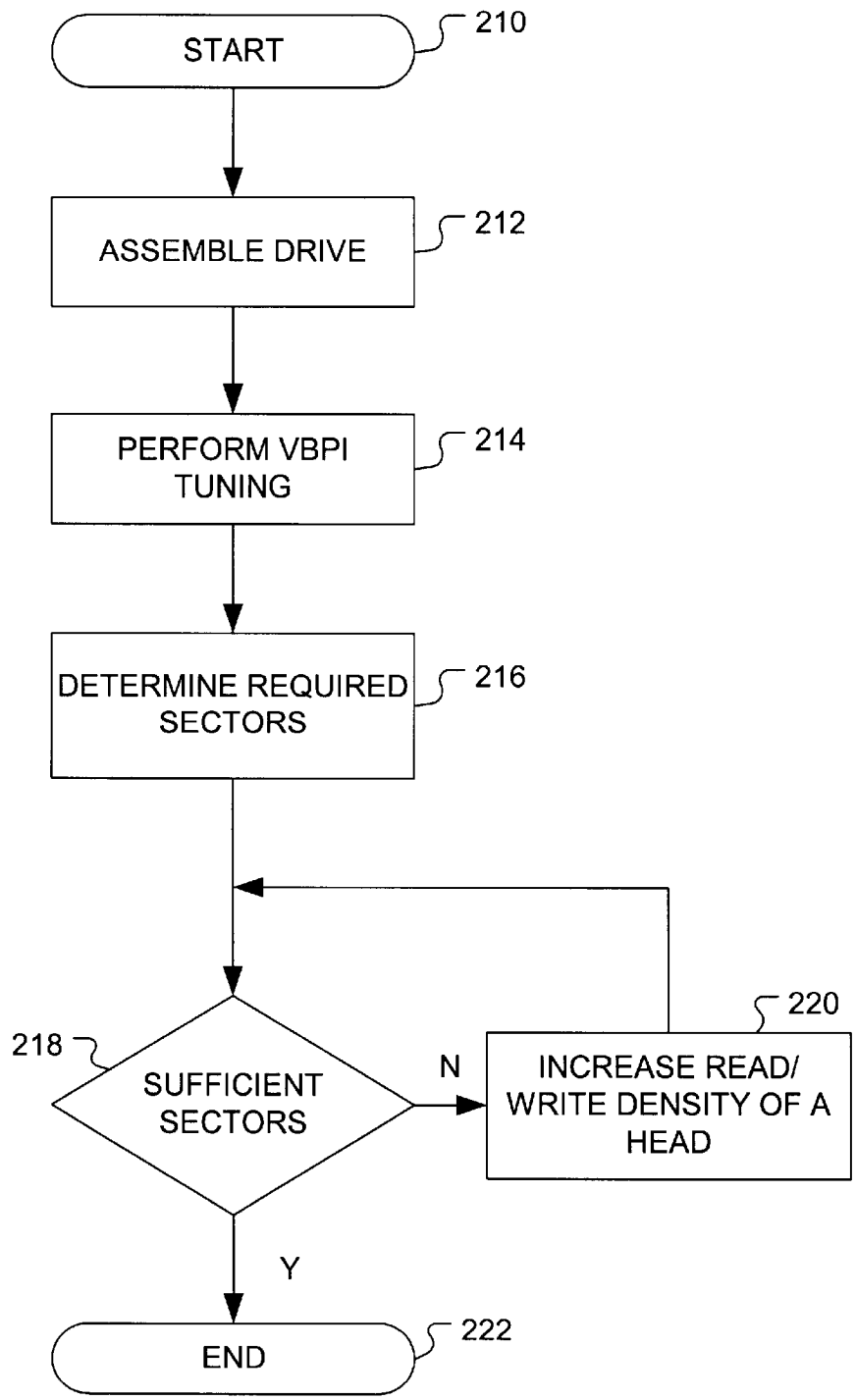
FIG. 2 is a flow diagram illustrating a method of a preferred embodiment of the present invention.

The method of the preferred embodiment is illustrated in the flow diagram of FIG. 2. The process starts at step 210, the drive is assembled at step 212, VPBI tuning is performed at step 214, and it is determined how many sectors need to be provided in order to provide sufficient capacity at step 216. At step 218 it is determined whether there are sufficient sectors and if there are not, the read/write density of a head is increased at step 220. Once sufficient sectors are present, the process ends at step 222.

Figure 3:
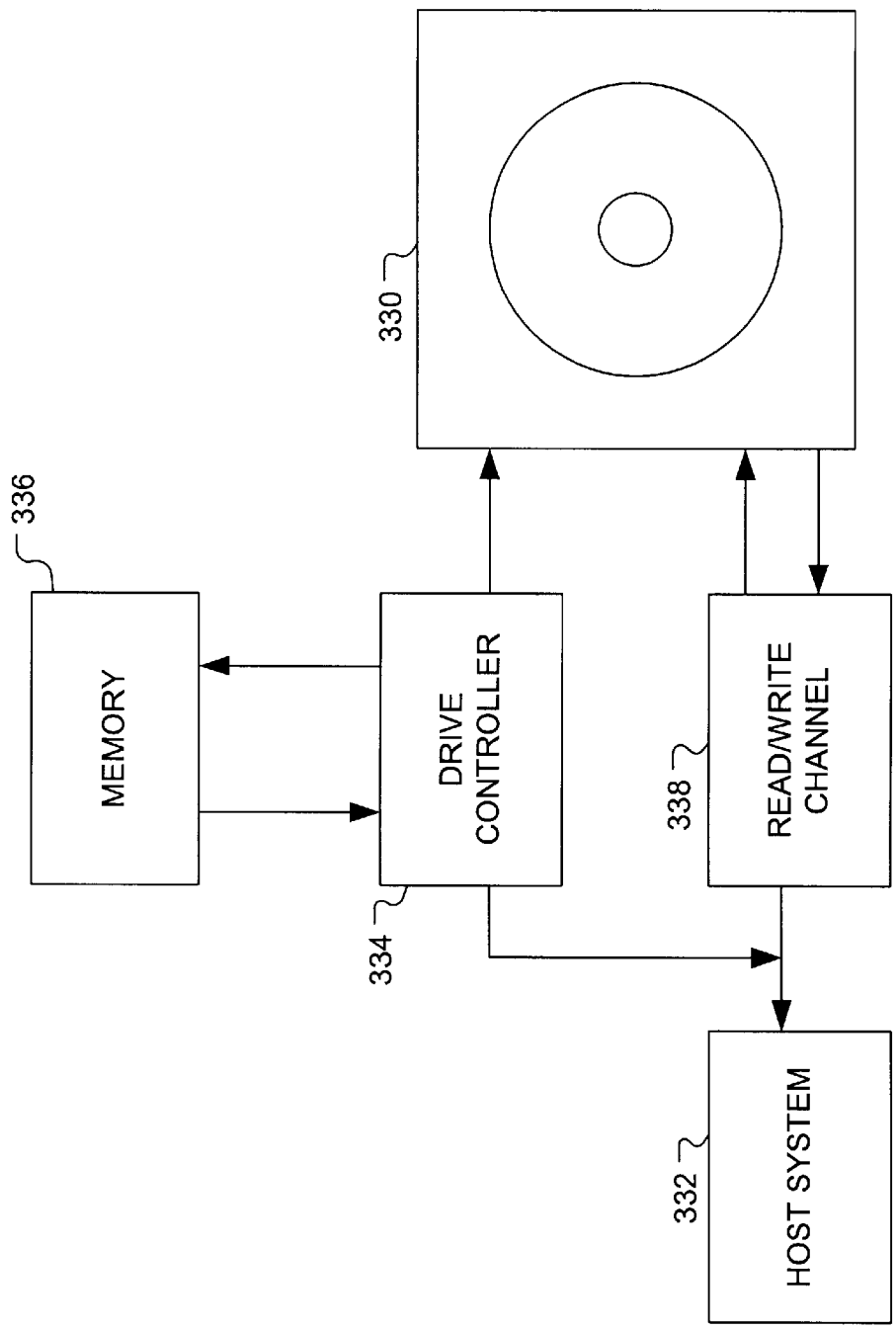
FIG. 3 is a schematic diagram illustrating an exemplary disc drive according to the preferred embodiment.

FIG. 3 is a schematic diagram which illustrates the exemplary disc drive of the preferred embodiment. The recording medium 330 is linked to a host system 332 by a drive controller 334 which controls the operation of the read/write heads (not illustrated). The VBPI settings for each of the heads is stored in memory 336 which is accessed by the drive controller 334 when it wishes to access the media surfaces. Information read and written to the media surfaces 330 is passed through read/write channel 338.

By adjusting the BPI using the method of the preferred embodiment, the number of spare sectors can be increased so that the drive that originally failed the process because of insufficient spares can be made to pass.

It will be appreciated that the use of setting numbers is arbitrary and that other VBPI tuning processes will use different values to represent the number of bits per inch at which a head is capable of recording and which is adjusted according to the method and apparatus of the preferred embodiment.

It is to be noted that in another embodiment of the present invention, the method of invention can be used to reduce the read/write recording density of a head if it is determined that the settings determined in the VBPI allocation process provides more than the required number of total sectors.

Alternatively, embodiments of the present invention may be described as follows:

A method and apparatus for increasing process yields of data storage devices. In the data storage device, data is stored on a plurality of media surfaces, and at least one read/write head is associated with each media surface in order to read/write data from/to each media surface. The present invention involves testing each read/write head in order to allocate a read/write density to each read/write head relating to the density at which each read/write head is capable of reading/writing data from/to a media surface. It is determined whether said data storage device will have sufficient logical storage sectors to provide a predetermined data storage capacity for said data storage device if the allocated read/write densities are used in said data storage device (as in steps 216 and 218). If necessary, the allocated read/write density of at least one read/write head is altered (as in step 220) so as to ensure that said storage device has sufficient logical storage sectors.

Preferably, the method involves testing the data storage device to determine a number of logical storage sectors provided by the plurality of media surfaces. It may involve calculating how many physical sectors will be provided if the allocated read/write densities are used, testing the data storage device to determine how many physical sectors are defective, and using the calculated number of physical sectors and the determined number of defective physical sectors to determine a number of logical storage sectors provided by the plurality of media surfaces.

Preferably, the method and apparatus provides for altering the allocated read/write density of at least one read/write head so as to minimise the risk of a read/write head having an altered allocated read/write density failing to perform at the altered allocated read/write density.

In an alternative embodiment, the step of allocating a read/write density to each read/write head may include allocating a bits per inch (BPI) setting to each read/write head. The BPI setting of at least one read/write head by one unit may be altered. It may further be provided for the BPI setting of read/write heads to be increased in a predetermined order until the storage device has sufficient logical storage.

The step of testing each read/write head may involve determining a quality index for each read/write head and allocating a read/write density relating to the determined quality index.

These and other modifications will be apparent to persons skilled in the art and are intended to fall within the scope of the following claims. It is to be understood that even though numerous characteristics and advantages of various embodiments of the present invention have been set forth in the foregoing description, together with details of the structure and function of various embodiments of the invention, this disclosure is illustrative only, and changes may be made in detail, especially in matters of structure and arrangement of parts without departing from the scope and spirit of the present invention.

What is claimed is:

1. A method of increasing process yields of data storage devices in which data is stored on a plurality of media surfaces, and at least one read/write head is associated with each media surface in order to read/write data from/to each media surface, the method comprising steps of:

(a) testing each read/write head in order to allocate a read/write density to each read/write head relating to the density at which each read/write head is capable of reading/writing data from/to a media surface;

(b) identifying defective storage sectors on the media surfaces to determine whether a selected data storage device will have sufficient logical storage sectors to provide a predetermined data storage capacity for said data storage device if the allocated read/write densities are used in said data storage device; and (c) altering the allocated read/write density of at least one read/write head if necessary so as to ensure that said storage device has sufficient logical storage sectors in view of the identified defective storage sectors.

2. A method as claimed in claim 1, wherein step (b) comprises testing the data storage device to determine a number of logical storage sectors provided by the plurality of media surfaces.

3. A method as claimed in claim 1, wherein step (b) comprises calculating how many physical sectors will be provided if the allocated read/write densities are used, testing the data storage device to determine how many physical sectors are defective, and using the calculated number of physical sectors and the determined number of defective physical sectors to determine a number of logical storage sectors provided by the plurality of media surfaces.

4. A method as claimed in claim 1, wherein step (c) comprises altering the allocated read/write density of at least one read/write head so as to reduce the risk of a read/write head having an altered allocated read/write density failing to perform at said altered allocated read/write density.

5. A method as claimed in claim 1, wherein allocating a read/write density to each read/write head comprises allocating a bits per inch (BPI) setting to each read/write head.

6. A method as claimed in claim 5, wherein step (c) comprises altering the BPI setting of at least one read/write head by at least one unit.

7. A method as claimed in claim 6, wherein step (c) comprises increasing the BPI setting of read/write heads in a predetermined order until said storage device has sufficient logical storage.

8. A method as claimed in claim 1, wherein testing each read/write head comprises determining a quality index for each read/write head and allocating a read/write density relating to the determined quality index.

9. A data storage device produced using the method of claim 1.

10. The data storage device as claimed in claim 9, wherein the data storage device is a magnetic disc drive.

11. The data storage device as claimed in claim 9, including a controller, and a memory accessible by the controller, and wherein the read/write densities allocated to each read/write head are stored in said memory.

12. An apparatus for increasing process yields of data storage devices in which data is stored on a plurality of media surfaces, and at least one read/write head is associated with each media surface in order to read/write data from/to each media surface, the apparatus comprising:

first means for testing each read/write head in order to allocate a read/write density to each read/write head relating to the density at which each read/write head is capable of reading/writing data from/to a media surface;

second means for identifying defective storage sectors on the media surfaces to determine whether said data storage device will have sufficient logical storage sectors to provide a predetermined data storage capacity for said data storage device if the read/write densities allocated by the first means are used in said data storage device; and third means for altering the allocated read/write density of at least one read/write head as necessary so as to ensure that said storage device has sufficient logical storage sectors in view of the identified defective storage sectors.

13. The apparatus as claimed in claim 12, wherein said third means alters the allocated read/write density of at least one read/write head in such a manner so as to reduce the risk of a read/write head having an increased allocated read/write density failing to perform at said increased allocated read/write density.

14. The apparatus as claimed in claims 12, wherein said first means and said third means allocate a read/write density in the form of a bits per inch (BPI) setting for each read/write head.

15. The apparatus as claimed in claim 14, wherein said third means alters the BPI setting of at least one read/write head by one unit.

16. The apparatus as claimed in claim 15, wherein said third means increases the BPI setting of read/write heads in a predetermined order until said storage device has sufficient logical storage.

17. The apparatus as claimed in claim 12, wherein said first means tests each read/write head to determine a quality index for each read/write head and allocates a read/write density to said head which relates to the determined quality index.

18. A method, comprising:

identifying a number of defective storage sectors on a plurality of media surfaces adjacent which a corresponding plurality of read/write heads are respectively disposed; and increasing a linear bit recording density of at least one of said heads to account for said defective storage sectors and provide a final desired number of logical storage sectors.

19. A method as claimed in claim 18, further comprising a prior step of allocating an initial linear bit recording density to each read/write head relating to the density at which each read/write head is capable of reading/writing data from/to a respective media surface, and wherein the increasing step increases the initial linear bit recording density of said at least one of said heads.

20. A method as claimed in claim 18, wherein the allocating step provides an initial desired number of logical storage sectors to meet a predetermined data storage capacity and an initial desired number of spare storage sectors for the logical storage sectors.

21. A data storage device produced using the method of claim 18.

* * * * *